(12) United States Patent
McWilliams et al.

(10) Patent No.: US 6,454,983 B1
(45) Date of Patent: Sep. 24, 2002

(54) SINGLE SCREW EXTRUSION OF POLYMERS

(75) Inventors: Douglas Stephens McWilliams, Kingsport, TN (US); Harold Eugene Dobbs, Kingsport, TN (US); Scott Arnold Hanson, Longview, TX (US); Emily Tedrow Bell, East Longmeadow, MA (US)

(73) Assignee: Eastman Chemical Company, Kingsport, NY (US)

( * ) Notice: Subject to any disclaimer, the term of this patent is extended or adjusted under 35 U.S.C. 154(b) by 0 days.

(21) Appl. No.: 09/454,016

(22) Filed: Dec. 3, 1999

Related U.S. Application Data

(60) Provisional application No. 60/112,907, filed on Dec. 18, 1998.

(51) Int. Cl.[7] ................................................. B29C 47/00
(52) U.S. Cl. ............. 264/211; 264/211.21; 264/331.18; 264/331.21
(58) Field of Search ............................ 264/211, 211.21, 264/349, 331.21, 331.18; 524/157, 236

(56) References Cited

U.S. PATENT DOCUMENTS

| | | |
|---|---|---|
| 2,465,319 A | 3/1949 | Whinfield et al. |
| 3,047,539 A | 7/1962 | Pengilly |
| 4,904,825 A | 2/1990 | Govindan |
| 5,053,531 A | 10/1991 | Govindan |
| 5,110,663 A * | 5/1992 | Nishiyama et al. |
| 5,187,214 A | 2/1993 | Govindan |
| 5,292,587 A * | 3/1994 | Funaki et al. |
| 5,458,832 A * | 10/1995 | Kabumoto et al. |
| 6,271,291 B1 * | 8/2001 | McWilliams et al. |

FOREIGN PATENT DOCUMENTS

| | | |
|---|---|---|
| CA | 2146715 | 10/1995 |
| EP | 0402484 | 12/1990 |
| JP | 3277627 | 12/1991 |
| JP | 06011904 | 1/1994 |
| JP | 06329772 | 11/1994 |
| WO | WO9718253 | 5/1997 |

OTHER PUBLICATIONS

Plastic Engineering Handbook, 4th ed., Ed. Joel Frados, pp. 846, 852–853 (1976).*
Plastics Extrusion Technology, 2nd ed., Allan L. Griff, pp. 298–299 (1985).*
Database WPI; AN 1972–42448T XP 002135186 & JP 470231878 (Unitika Ltd.).

* cited by examiner

*Primary Examiner*—Mark Eashoo
(74) *Attorney, Agent, or Firm*—Betty J. Boshears, Esq.; Bernard J. Graves, Jr., Esq.

(57) ABSTRACT

A process is provided for single screw extrusion of a composition or masterbatch comprising a polymer and an antistatic agent wherein the feed zone temperature is maintained below 385° F. in order to allow processability of the composition.

31 Claims, No Drawings

SINGLE SCREW EXTRUSION OF POLYMERS

CROSS-REFERENCE TO RELATED APPLICATIONS

This application claims priority upon provisional application Ser. No. 60/112,907 filed Dec. 18, 1998 and the No. 60/112907, filed is herein incorporated by this reference in its entirety.

FIELD OF THE INVENTION

This invention is concerned with compositions and masterbatches of selected antistatic agents in polymers, preferably certain copolyesters based on terephthalic acid, naphthalenedicarboxylic acid, and/or 1,4-cyclohexanedicarboxylic acid and on the blending of these masterbatches with the same or other homo- or copolyesters to provide films, sheeting, and thermoformed articles having antistatic properties. Specifically, antistat additives for polymers, preferably certain copolyesters are disclosed which provide the required antistat performance in the final film, sheet, or molded article. However, these additives cause feeding problems during single screw extrusion processing for some polymers, including the preferred copolyester compositions, e.g., Eastar PETG 6763. It has now been found that certain extrusion processing conditions result in improved processing and therefore allow these antistat additives to be used.

BACKGROUND OF THE INVENTION

Polyesters are widely used as extrusion and injection molding resins for applications such as fibers, films, sheeting, food and beverage containers and the like. Commonly used polyesters include polyethylene terephthalate (PET), poly-1,4-butylene terephthalate (PBT), and poly-1,4-cyclohexanedimethylene terephthalate (PCT). Copolyesters are frequently used when special properties such as lower processing temperatures, clarity, or inhibited crystallization are needed. Polyesters like most other synthetic polymers are poor conductors of electricity. Thus, during extrusion, processing, or handling of such polymers, static charges may accumulate. This is especially true under conditions of low relative humidity. Static charge is highly undesirable in that it can cause material handling problems during processing, lead to shocks when molded parts are handled, lead to the collection of dust on packages, and cause damage to sensitive electronic parts that are stored in plastic packaging due to dissipation of static charge. Therefore, it would be advantageous if thermoplastic polyesters could be provided which had good antistatic properties.

There are many antistat additives available for use in thermoplastic polymers including polyesters. Often these additives are blended with the same or other thermoplastic polymer in higher concentration to form a masterbatch that is subsequently let down for film or sheet extrusion or injection molding. Some antistat additives can cause processing problems such as poor feeding during extrusion that can prohibit their use.

SUMMARY OF THE INVENTION

In accordance with this invention, antistat additives for polymers, preferably polyesters and copolyesters are disclosed which provide the required antistat performance in the final film, sheet, or molded article. However, these additives do cause pellet conveying problems in the extruder feed zone during single screw extrusion processing, such as poor feeding, for some polymers, including preferred copolyester compositions, e.g. Eastar PETG 6763. The antistatic agent is present in an amount of greater than 0.5 weight percent to about 10 weight percent based on the final composition. It has now been found unexpectedly that the control of certain extrusion processing conditions results in improved processing and therefore, allows these antistat additives to be used in the polymers. More particularly, it has been found that the temperature of the feed zone during the single screw extrusion process must be maintained at no greater than 385° F. Preferably the temperature of the feed zone should be maintained within a range of about 200° F. to no greater than 385° F.; more preferably the temperature should be maintained within a range of about 300° F. to about 365° F.; and still more preferably within a range of about 340° F. to about 365° F.

DETAILED DESCRIPTION OF THE INVENTION

The novel extrusion process of the present invention involves a conventional single screw extrusion process having a feed zone, a compression zone, a metering zone, and a zone in which material is passed to a die. The temperatures in all zones are maintained in the conventional range of about 392° F. to about 572° F., except for the temperature in the feeding zone. In the feeding zone it has been found essential to maintain the temperature at no greater than 385° F. in order that the antistat-containing polymer composition or masterbatch may be processed. Preferably the temperature of the feed zone should be maintained within a range of about 200° F. to no greater than 385° F.; more preferably the temperature should be maintained within a range of about 300° F. to about 365° F.; and still more preferably within a range of about 340° F. to about 365° F. As indicated, the antistatic agent is present in amounts of from greater than 0.5 weight percent to about 10 weight percent, based on the final composition, preferably from about 3 to about 7 weight percent, and still more preferably in amounts ranging from about 0.6 to about 1.5 weight percent.

The process of the present invention is suitable for use with any composition or masterbatch of a polymer and the antistatic agent. Suitable for use herein are any polymers such as polyesters, copolyesters, polyolefins, styrene resins such as polystryene, styrene-acrylonitrile copolymers, poly(styrene-acrylonitrile-butadiene) terpolymers, high impact polystyrene, poly (methylacrylate), poly (methylmethacrylate) and poly (vinyl acetate), polycarbonates, polyamides, polyacetals, phenol-formaldehyde resins, vinyl resins, polyvinyl chloride, copolymers of vinyl chloride with vinyl acetate, vinylidene chloride, acrylonitrile, polyurethanes, poly (phenylene ether) and the like.

Preferred for use herein are polyesters and copolyesters and mixtures thereof. Preferred polyesters nonexclusively include linear, thermoplastic, crystalline, or amorphous polyesters produced by conventional polymerization techniques from one or more diol(s) with one or more dicarboxylic acids.

Copolyesters by definition comprise one or more diol(s) with two or more dicarboxylic acids, or one or more dicarboxylic acid(s) with two or more diols. Exemplary diol components of the described polyesters and copolyesters may be selected from ethylene glycol, neopentyl glycol, 1,4-cyclohexanedimethanol, 1,2-propanediol, 1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, Z,8-bis(hydroxymethyl)-tricyclo-[5.2.1.0]-decane wherein Z represents 3, 4, or 5; and diols containing one or more oxygen atoms in the chain, e.g. diethylene glycol, triethylene glycol, dipropylene glycol, tripropylene glycol, and the like. In general, these diols contain 2 to 18, preferably 2 to 8 carbon atoms. Cycloaliphatic diols can be employed in their cis or trans configuration or as mixtures of both forms.

Exemplary acid components (aliphatic, alicyclic, or aromatic dicarboxylic acids) of the linear copolyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In polymer preparation, it is often preferable to use a functional acid derivative thereof such as the dimethyl, diethyl, or dipropyl ester of the dicarboxylic acid. The anhydrides or acid halides of these acids also may be employed where practical. The linear polyesters or copolyesters may be prepared according to polyester of copolyester forming conditions well known in the art. For example, a mixture of one or more dicarboxylic acids, preferably aromatic dicarboxylic acids, or ester forming derivatives thereof, and one or more diols may be heated in the presence of esterification and/or polyesterification catalysts at temperatures in the range of about 150° C. to about 300° C., and pressures of atmospheric to about 0.2 mm Hg. Normally, the dicarboxylic acid(s) or derivative thereof is esterified or transesterified with the diol(s) at atmospheric pressure and at a temperature at the lower end of the specified range. Polycondensation then is effected by increasing the temperature and lowering the pressure while excess diol is removed from the mixture.

Exemplary polyesters useful in the practice of this invention are poly(ethylene terephthalate) (PET), poly(butylene terephthalate) (PBT), and [poly(cyclohexanedimethylene) terephthalate].

Exemplary copolyesters useful in the practice of this invention include terephthalate, naphthalenedicarboxylate and 1,4-cyclohexanedicarboxylate copolyesters containing ethylene glycol and 1,4-cyclohexanedimethanol (CHDM) moieties. The CHDM concentrations will generally range from about 10 to about 60 mole %. The copolyesters will generally contain at least 80 mole % of terephthalic, naphthalenedicarboxylic, or 1,4-cyclohexanedicarboxylic acid moieties. Mixtures of the acids may be used if desired. In addition, from 0 to about 20 mole % of other acids may be used. Operable modifying acid(s) include those containing about 4 to about 40 carbon atoms such as succinic, glutaric, adipic, sebacic, suberic, isophthalic, and the like acids, and mixtures thereof. In addition, other gylcols may be used in amounts of from about 10 to about 90 mole %. The other glycol(s) include those containing about 3 to about 12 carbon atoms such as 1,3-propanediol, propylene glycol, 1,4-butanediol, 1,6-hexanediol, neopentyl glycol, 2,2,4,4-tetramethyl-1,3-cyclobutanediol, diethylene glycol, polyethylene glycol, and the like, and mixtures thereof. Small amounts of branching agents such as trimellitic acid, pyromellitic dianhydride, trimethylolpropane, pentaerythritol, and the like may be used. Generally less than about 2 mole % of such branching agents may be used.

Preferred copolyesters for use herein comprise about 100 mole percent terephthalic acid, about 40 to about 90 mole percent ethylene glycol, and about 10 to about 60 mole percent CHDM. More preferred are copolyesters comprising about 100 mole percent terephthalic acid, about 65 to about 75 mole percent ethylene glycol, and about 25 to about 35 mole percent CHDM.

Preferred copolyesters for use herein comprise about 100 mole percent terephthalic acid, about 40 to about 90 mole percent ethylene glycol, and about 10 to about 60 mole percent neopentyl glycol (NPG). More preferred are copolyesters comprising about 100 mole percent terephthalic acid, about 60 to about 80 mole percent ethylene glycol, and about 20 to about 40 mole percent NPG.

Preferred copolyesters for use herein comprise about 10 to about 50 mole percent isophthalic acid, about 50 to about 90 mole percent terephthalic acid, and about 100 mole percent CHDM. More preferred are copolyesters comprising about 15 to about 40 mole percent isophthalic acid, about 60 to about 85 mole percent terephthalic acid, and about 100 mole percent CHDM.

The CHDM and 1,4-cyclohexanedicarboxylic components may be in the cis form, the trans form, or a mixture of cis and trans isomers. The acid moiety may be derived from the acid or a suitable synthetic equivalent such as a lower alkyl ester. The dimethyl esters are widely used to make polyesters. The naphthalenedicarboxylate moiety will generally be derived from 2,6-naphthalenedicarboxylic acid or its lower alkyl esters containing 1 to 4 carbon atoms. However, other naphthalenedicarboxylic acid isomers or mixtures of isomers may be used if desired. The preferred isomers are the 2,6-, 2,7-, 1,4- and 1,5-isomers.

The mole percentages of the diol component of copolyester of the invention total 100 mole %. The mole percentages of the acid component of the copolyester of the invention total 100 mole %.

The polyesters and copolyesters of this invention are well known and many of them are commercially available from Eastman Chemical Company. Methods for their preparation are described in U.S. Pat. Nos. 2,465,319 and 3,047,539. Useful polyesters and copolyesters will have inherent viscosity values (I.V.) of about 0.5 dL/g to about 1.5dL/g, but those with values of about 0.6 dL/g to about 1.0 dL/g are preferred. Inherent viscosity is determined in a 60/40 (wt/wt) phenol/tetrachloroethane solution at a concentration of 0.5 grams per 100 ml at 25° C.

The antistatic compositions of the invention are thermally stable at temperatures in excess of 200° C. Thermal stability is weight loss of less than 5 weight percent when heated to temperatures up to about 275° C.

Melting point as defined herein is measured by DSC (differential scanning calorimetry) analysis. DSC measurements, if made, were made at a scan rate of 20° C./min.

The antistatic agents are quaternary ammonium salts having thermal stability at temperatures greater than 200° C. Exemplary are quaternary ammonium alkyl benzene sulfonate salts, quaternary ammonium alkane sulfonate salts, and the like. Specific examples include octyl dimethyl hydroxyethyl ammonium dodecylbenzene sulfonate and octyl dimethyl hydroxyethyl ammonium methane sulfonate. Other compounds of this type are listed in U.S. Pat. Nos. 4,904,825, 5,053,531 and 5,187,214. Further exemplary of the antistatic agents suitable for use herein are represented by the following formula:

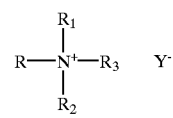

wherein
R is a $C_2$–$C_{22}$ alkyl, preferably a $C_8$–$C_{18}$ alkyl, and $R_1$ is selected from the group consisting of $C_1$–$C_{22}$ alkyl and an alkyleneoxy radical, "Z" that may be represented by the formula, [—CH$_2$—C(A)H—O]$_x$H, wherein A is hydrogen, methyl or ethyl, and x is an integer of from 1–5, e.g. hydroxyethyl, hydroxypropyl, hydroxybutyl, poly(ethyleneoxy) hydroxyethyl, poly(propyleneoxy) 2-hydroxypropyl, and poly(butyleneoxy) 2-hydroxybutyl. Preferably R$_1$ is selected from the group consisting of C$_1$–C$_3$ alkyl or C$_8$–C$_{18}$ alkyl, e.g. methyl, ethyl, n-propyl, isopropyl, octyl, decyl, dodecyl, hexadecyl, and octadecyl, or the alkyleneoxy radical Z wherein A is hydrogen or methyl and x is 1 to 3. Still more preferably, R$_1$ s a C$_1$–C$_3$ alkyl or alkylenenoxy radical Z wherein A is hydrogen and x is 1 to 2. When x is greater than 1, the sulfonate compound may be liquid, which makes it easier to handle.

R$_2$ in the above formula is selected from the group consisting of C$_1$–C$_3$ alkyl, e.g. methyl, ethyl, n-propyl and isopropyl, and the radical Z, wherein A and x are as defined with respect to R$_1$. Alternatively R$_1$ and R$_2$ may also join together to form a six-membered morpholino group.

R$_3$ in the above formula is a group represented by the alkylenoxy radical Z, wherein A and x are as defined with respect to R$_1$; and Y is the anion, R'SO$_3$, wherein R' is a C$_1$–C$_{18}$alkyl, preferably a C$_1$–C$_2$alkyl, e.g. methyl and ethyl or a C$_8$–C$_{18}$ alkylphenyl, preferably a C$_{10}$C$_{13}$ alkylphenyl. Preferably, the alkyl phenyl is a para-alkylphenyl.

With respect to R, R$_1$, and R', the term alkyl denotes a univalent, essentially saturated branched or straight chained alkyl group. Representative of such alkyl groups include methyl, ethyl, propyl, butyl, pentyl, hexyl, isohexyl, heptyl, octyl, nonyl, decyl, undecyl, dodecyl, tridecyl, tetradecyl, pentadecyl, hexadecyl, heptadecyl, octadecyl, soya, eicosyl and the like. When derived from naturally occurring materials, the group R$_1$, and R' may contain a small amount of unsaturation and may be comprised of a mixture of alkyl groups. For example, commercially available dodecyl benzene sulfonic acid is a benzene sulfonic acid in which the alkyl substituent on the benzene ring is a mixture of C$_{10}$–C$_{13}$ alkyl groups, the nominal number of carbon atoms being about 12.

The polymer compositions and masterbatches containing the antistatic agent can be readily prepared using any conventional blending equipment such as single screw extruders, twin screw extruders, Brabender Plastographs, Sigma blade mixers, and the like. In addition, the polymer compositions can be prepared from a masterbatch, which is let down to the desired concentration.

Although not required, additives normally used in copolyesters may be used if desired. Such additives include colorants, dyes, pigments, fillers, antioxidants, stabilizers, flame retardants, impact modifiers, buffers and the like.

For the purposes of this invention, a masterbatch is as defined by one of ordinary skill in the art. More particularly, a masterbatch is a composition comprising a polymer and an antistatic agent where the antistat agent concentration is higher than desired in the final product, and which composition is subsequently let down in the same or other polymer to produce a final product with the desired concentration of antistatic agent.

The polyester and copolyester compositions of this invention are useful in applications where antistatic and clarity properties are required. The compositions are useful as monolayer film, monolayer sheet, as a layer(s) in multilayer film or multilayer sheet, and thermoformed articles produced from film or sheet such as clamshell packaging.

All percentages expressed herein refer to weight percentages unless otherwise specified.

This invention can be further illustrated by the following examples of preferred embodiments thereof, although it will be understood that these examples are included merely for purposes of illustration and are not intended to limit the scope of the invention unless otherwise specifically indicated.

Examples

In the examples, the following is to be noted.

Larostat HTS 905A antistat is a quaternary ammonium sulfonate salt, sold under the registered trademark of BASF Corporation.

Eastar PETG 6763 is a copolyester based on terephthalic acid, ethylene glycol, and 1,4-cyclohexanedimethanol, produced and sold by Eastman Chemical Company.

The copolyester is PETG containing 12 mole % CHDM, 88 mole % ethylene glycol, and 100 mole % terephthalic acid.

Example 1

A masterbatch consisting of 3.5 weight percent Larostat HTS 905A antistat and a polyethylene terephthalate copolyester containing 12 mole percent CHDM was prepared using a 30-mm Werner & Pfleiderer twin extruder. A 50/50 pellet blend consisting of the masterbatch and PETG 6763 was extruded into 20-mil sheet using a 1.5-inch Killion screw extruder. In order to generate a sheet sample for subsequent of antistatic properties, if feeding problems developed, then the extruder was force fed. Consequently, the extruder amps did not provide a good indication of the extrusion performance. Alternatively, the performance was indicated by higher transition zone pressure and melt pressure at the end of the extruder. The extrusion conditions and the resulting extrusion performance as indicated by the transition zone and melt pressures are given in Table 1.1. It was necessary to force feed samples 1 through 3, while good feeding was observed for samples 4 through 9. An additional summary of the results is provided in Table 1.2. Although the scatter in the data is high, the results show that the average transition and melt pressures were higher indicating better feeding when the feed zone temperature was between 340° F. and 365° F. compared to when the feed zone was 390° F. In addition, the extruder lost feed completely during one of the experiments where the feed zone temperature was 390° F. Thus, feeding during sheet extrusion is improved by using a feed zone temperature between 340° F. and 365° F.

TABLE 1.1

Effect of Feed Zone Temperature on Feeding during Extrusion

| | Extrusion Conditions | | | | | | Transition | Melt |
|---|---|---|---|---|---|---|---|---|
| Sample | Z1 (° F.) | Z2 (° F.) | Z3 (° F.) | A (° F.) | Die (° F.) | RPM | Pressure (psi) | Pressure (psi) |
| 1 | 390 | 420 | 470 | 470 | 470 | 103 | 260 | 120 |
| 2 | 390 | 420 | 470 | 470 | 470 | 110 | No Feed | No Feed |
| 3 | 390 | 420 | 490 | 470 | 470 | 111 | 300 | 100 |
| 4 | 340 | 400 | 500 | 470 | 470 | 135 | 450 | 170 |
| 5 | 350 | 400 | 500 | 470 | 470 | 135 | 660 | 250 |
| 6 | 365 | 400 | 470 | 470 | 470 | 135 | 490 | 210 |
| 7 | 360 | 400 | 510 | 470 | 470 | 135 | 320 | 120 |
| 8 | 358 | 400 | 490 | 470 | 470 | 135 | 600 | 500 |
| 9 | 358 | 400 | 490 | 460 | 460 | 135 | 500 | 150 |

Z = zone;
A = adapter

TABLE 1.2

Summary of Results

| Feed Zone Temperature (° F.) | Transition Zone Pressure (psi) | Melt Pressure (psi) |
|---|---|---|
| >365 | 280 +/− 30 | 110 +/− 14 |
| <365 | 500 +/− 120 | 230 +/− 140 |

Example 2

A masterbatch consisting of 5.3 weight percent Larostat HTS 905A antistat and a polyethylene terephthalate copolyester containing 12 mole percent CHDM was prepared using a 30-mm Werner & Pfleiderer twin screw extruder. The masterbatch was then mixed via pellet-pellet blending with Eastar PETG 6763 and subsequently extruded into 20-mil sheet using a 1.5-inch Killion single screw extruder. The level of masterbatch, the extrusion conditions, and the resulting extrusion performance as indicated by the extruder amps, output, and exit melt pressure are given in Table 2.1. The data shows that consistently the amps, output, and melt pressure are higher indicating better feeding during extrusion when the feed zone temperature is 300° F. and 365° F. while there is a dramatic decrease in amps, output, and melt pressure when the feed zone temperature is 430° F. Thus, feeding during sheet extrusion is improved by using feed zone temperatures of 300° F. and 365° F.

TABLE 2.1

Effect of Feed Zone Temperature on Feeding during Extrusion

| Sample | Masterbatch Level (%) | Extrusion Conditions | | | | | | | | Melt |
|---|---|---|---|---|---|---|---|---|---|---|
| | | Z1 (° F.) | Z2 (° F.) | Z3 (° F.) | A (° F.) | Die (° F.) | RPM | Amps | Output (ft/min) | Pressure (psi) |
| 1 | 14 | 300 | 430 | 470 | 470 | 470 | 40 | 8.0 | 4.1 | 500 |
| 2 | 14 | 365 | 430 | 470 | 470 | 470 | 40 | 6.2 | 4.1 | 500 |
| 3 | 14 | 430 | 430 | 470 | 470 | 470 | 40 | 5.0 | 3.3 | 285 |
| 4 | 14 | 300 | 430 | 500 | 470 | 470 | 80 | 10.5 | 7.9 | 715 |
| 5 | 14 | 365 | 430 | 500 | 470 | 470 | 80 | 10.0 | 7.9 | 710 |
| 6 | 14 | 430 | 430 | 500 | 470 | 470 | 80 | 6.2 | 5.2 | 220 |
| 7 | 23.6 | 300 | 430 | 470 | 470 | 470 | 80 | 11.0 | 7.9 | 910 |
| 8 | 23.6 | 365 | 430 | 470 | 470 | 470 | 80 | 9.0 | 7.5 | 870 |
| 9 | 23.6 | 430 | 430 | 470 | 470 | 470 | 80 | 6.2 | 4.8 | 230 |
| 10 | 23.6 | 300 | 430 | 500 | 470 | 470 | 40 | 6.0 | 3.9 | 165 |
| 11 | 23.6 | 365 | 430 | 500 | 470 | 470 | 40 | 5.5 | 3.9 | 115 |
| 12 | 23.6 | 430 | 430 | 500 | 470 | 470 | 40 | 4.3 | 3.1 | 45 |
| 13 | 23.6 | 300 | 430 | 500 | 470 | 470 | 80 | 10.1 | 8.1 | 555 |
| 14 | 23.6 | 365 | 430 | 500 | 470 | 470 | 80 | 9.0 | 6.5 | 435 |
| 15 | 23.6 | 430 | 430 | 500 | 470 | 470 | 80 | 6.0 | 4.5 | 65 |
| 16 | 14 | 300 | 430 | 500 | 470 | 470 | 40 | 4.0 | 4.2 | 155 |
| 17 | 14 | 365 | 430 | 500 | 470 | 470 | 40 | 3.8 | 2.9 | 135 |
| 18 | 14 | 430 | 430 | 500 | 470 | 470 | 40 | 3.0 | 3.2 | 110 |
| 19 | 23.6 | 300 | 430 | 500 | 470 | 470 | 80 | 7.5 | 6.2 | 265 |
| 20 | 23.6 | 365 | 430 | 500 | 470 | 470 | 80 | 7.5 | 5.8 | 240 |
| 21 | 23.6 | 430 | 430 | 500 | 470 | 470 | 80 | 5.0 | 4.4 | 65 |
| 22 | 14 | 300 | 430 | 470 | 470 | 470 | 80 | 10.5 | 7.8 | 1095 |
| 23 | 14 | 365 | 430 | 470 | 470 | 470 | 80 | 9.5 | 8.0 | 1040 |
| 24 | 14 | 430 | 430 | 470 | 470 | 470 | 80 | 6.0 | 5.1 | 250 |
| 25 | 23.6 | 300 | 430 | 470 | 470 | 470 | 40 | 5.0 | 3.7 | 310 |
| 26 | 23.6 | 365 | 430 | 470 | 470 | 470 | 40 | 5.0 | 3.4 | 260 |
| 27 | 23.6 | 430 | 430 | 470 | 470 | 470 | 40 | 4.1 | 3.0 | 175 |
| 28 | 14 | 300 | 430 | 470 | 470 | 470 | 40 | 7.3 | 4.4 | 595 |
| 29 | 14 | 365 | 430 | 470 | 470 | 470 | 40 | 6.6 | 4.3 | 590 |
| 30 | 14 | 430 | 430 | 470 | 470 | 470 | 40 | 5.8 | 3.7 | 355 |
| 31 | 23.6 | 300 | 430 | 470 | 470 | 470 | 80 | 10.7 | 8.7 | 1075 |
| 32 | 23.6 | 365 | 430 | 470 | 470 | 470 | 80 | 10.5 | 7.8 | 1235 |
| 33 | 23.6 | 430 | 430 | 470 | 470 | 470 | 80 | 6.0 | 4.6 | 145 |
| 34 | 14 | 300 | 430 | 500 | 470 | 470 | 40 | 7.9 | 4.7 | 315 |
| 35 | 14 | 365 | 430 | 500 | 470 | 470 | 40 | 6.0 | 4.3 | 275 |
| 36 | 14 | 430 | 430 | 500 | 470 | 470 | 40 | 5.5 | 3.7 | 165 |

Z = zone
A = adapter

The invention has been described in detail with particular reference to preferred embodiments thereof, but it will be understood that variations and modifications can be effected within the spirit and scope of the invention. Moreover, all patents, patent applications, provisional patent applications and literature references cited above are incorporated herein by reference for any disclosure pertinent to the practice of this invention.

We claim:
1. A process for single screw extrusion of a polymer composition comprising a copolyester and a quaternary ammonium salt having thermal stability at a temperature greater than 200° C., wherein the quaternary ammonium salt is present in an amount ranging from greater than 0.5 to about 10 weight percent, based on the total composition, comprising:
  (a) passing the copolyester composition through a feed zone of a single screw extruder, the feed zone being maintained at a temperature no greater than 385° F.;
  (b) thereafter passing the resulting composition from (a) through a compression zone of the single screw extruder, the compression zone being maintained at a temperature ranging from about 392° F. to about 572° F.;
  (c) thereafter passing the resulting composition from (b) through a metering zone of the single screw extruder, the metering zone being maintained at a temperature ranging from about 392° F. to about 572° F.; and
  (d) thereafter passing the resulting composition from (c) through a die which is maintained at a temperature ranging from about 392° F. to about 572° F.

2. The process according to claim 1 wherein the quaternary ammonium salt is a quaternary ammonium alkyl benzene sulfonate salt.

3. The process according to claim 1 wherein the quaternary ammonium salt is a quaternary ammonium alkane sulfonate salt.

4. The process according to claim 1 wherein the quaternary ammonium salt is octyl dimethyl hydroxyethyl ammonium dodecylbenzene sulfonate.

5. The process according to claim 1 wherein the quaternary ammonium salt is octyl dimethyl hydroxyethyl ammonium methane sulfonate.

6. The process according to claim 1 wherein the quaternary ammonium salt is selected from compounds represented by the following formula:

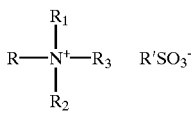

wherein R is a $C_2$–$C_{22}$ alkyl, $R_1$ is selected from the group consisting of $C_1$–$C_{22}$ alkyl and an alkyleneoxy radical $\{-CH_2-C(A)H-O\}_xH$, $R_2$ is selected from the group consisting of $C_1$–$C_3$ alkyl and the radical $\{-CH_2-C(A)H-O\}_xH$ or $R_2$ may join together with $R_1$ to form a morpholino group, $R_3$ is a radical $\{-CH_2-C(A)H-O\}_xH$, R' is selected from the group consisting of $C_1$–$C_{18}$ alkyl and $C_8$–$C_{18}$ alkylphenyl, wherein A is selected from hydrogen, methyl and ethyl, and x is 1.

7. The process according to claim 1 wherein the quaternary ammonium salt having thermal stability at a temperature greater than 200° C. is present in an amount ranging from about 3 to about 7 weight percent.

8. The process according to claim 7 wherein the quaternary 10 ammonium salt is present in an amount ranging from about 0.6 to about 1.5 weight percent.

9. The process according to claim 1 wherein the feed zone is maintained at a temperature ranging from about 200° F. to about 385° F.

10. The process according to claim 9 wherein the feed zone is maintained at a temperature ranging from about 300° F. to about 365° F.

11. The process according to claim 10 wherein the feed zone is maintained at a temperature ranging from about 340° F. to about 365° F.

12. The process according to claim 1 wherein said copolyester comprises from one or more diols with two or more dicarboxylic acids, or one or more dicarboxylic acids with two or more diols.

13. The process according to claim 12 wherein said one or more diols are selected from the group consisting of ethylene glycol, neopentyl glycol, 1,4-cyclohexanedimethanol, 1,2-propanediol, 1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, Z,8-bis(hydroxymethyl)-tricyclo-[5.2.1.0]-decane wherein Z represents 3, 4, or 5; diethylene glycol, triethylene glycol, dipropylene glycol, and tripropylene glycol.

14. The process of claim 13 wherein said diol is 1,4-cyclohexanedimethanol.

15. A The process according to claim 14 wherein said 1,4-cyclohexanedimethanol is present at about 10 to about 60 mole %.

16. The process according to claim 12 wherein said diols comprise 2 to 18 carbon atoms.

17. The process according to claim 16 wherein said diols comprise 2 to 8 carbon atoms.

18. The process according to claim 12 wherein said one or more acids are selected from the group consisting of terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, and 2,6-naphthalenedicarboxylic acid.

19. The process according to claim 18 wherein said acids comprise one or more of terephthalic acid, naphthalenedicarboxylic acid and 1,4-cyclohexanedicarboxylic acid.

20. The process according to claim 19 where said terephthalic acid, naphthalenedicarboxylic acid or 1,4-cyclohexanedicarboxylic acid are independently present at about 80 mole % or above.

21. The process according to claim 12 wherein said acids comprise one or more of terephthalic acid, naphthalenedicarboxylic acid and 1,4-cyclohexanedicarboxylic acid and wherein said diols comprise one or more of ethylene glycol and 1,4-cyclohexanedimethanol.

22. The process according to claim 21 where said terephthalic acid, naphthalenedicarboxylic acid or 1,4-cyclohexanedicarboxylic acid are independently present at about 80 mole % or above.

23. The process according to claim 12 wherein said one of said diols are present independently in the amount of about 10 to about 90 mole %.

24. The process according to claim 12 wherein said copolyester comprises about 100 mole percent terephthalic acid, about 40 to about 90 mole percent ethylene glycol, and about 10 to about 60 mole percent 1,4-cyclohexanedimethanol.

25. The process according to claim 24 wherein said copolyester comprises about 100 mole percent terephthalic acid, about 65 to about 75 mole percent ethylene glycol, and about 25 to about 35 mole percent 1,4-cyclohexanedimethanol.

26. The process according to claim 12 wherein said copolyester comprises about 100 mole percent terephthalic acid, about 40 to about 90 mole percent ethylene glycol, and about 10 to about 60 mole percent neopentyl glycol.

27. The process according to claim 26 wherein said copoyester comprises about 100 mole percent terephthalic acid, about 60 to about 80 mole percent ethylene glycol, and about 20 to about 40 mole percent neopentyl glycol.

28. The process according to claim 12 wherein said copolyester comprises about 10 to about 50 mole percent isophthalic acid, about 50 to about 90 mole percent terephthalic acid, and about 100 mole percent 1,4-cyclohexanedimethanol.

29. The process according to claim 12 wherein said copolyester comprises one or more branching agents selected from the group consisting of trimellitic acid, pyromellitic dianhydride, trimethylolpropane, and pentaerythritol.

30. The process according to claim 29 wherein said copolyester has an inherent viscosity of about 0.6 to about 1.0 dl/g as determined in a 60/40 (wt/wt) phenol/tetrachloroethane solution at a concentration of 0.5 grams per 100 ml at 25° C.

31. The process according to claim 12 wherein said copolyester has an inherent viscosity of about 0.5 to about 1.5 dl/g as determined in a 60/40 (wt/wt) phenol/tetrachloroethane solution at a concentration of 0.5 grams per 100 ml at 25° C.

* * * * *